US006805886B2

(12) United States Patent
Slaugh

(10) Patent No.: US 6,805,886 B2
(45) Date of Patent: Oct. 19, 2004

(54) FEED COMPOSITION FOR EGG-LAYING FOWL

(75) Inventor: Bartel T. Slaugh, West Chester, PA (US)

(73) Assignee: Eggland's Best, Inc., King of Prussia, PA (US)

( * ) Notice: Subject to any disclaimer, the term of this patent is extended or adjusted under 35 U.S.C. 154(b) by 21 days.

(21) Appl. No.: 10/191,940

(22) Filed: Jul. 9, 2002

(65) Prior Publication Data

US 2002/0197349 A1 Dec. 26, 2002

Related U.S. Application Data

(62) Division of application No. 09/535,125, filed on Mar. 24, 2000, now Pat. No. 6,436,451.
(60) Provisional application No. 60/126,352, filed on Mar. 26, 1999.

(51) Int. Cl.$^7$ ................................................ A23K 1/00
(52) U.S. Cl. ............................ 426/39; 426/614; 426/2; 426/807; 426/630
(58) Field of Search ............................ 426/39, 614, 2, 426/807, 630

(56) References Cited

U.S. PATENT DOCUMENTS

| | | | |
|---|---|---|---|
| 3,880,742 A | 4/1975 | James et al. | 195/31 R |
| 4,806,368 A | 2/1989 | Reddy | 426/61 |
| 5,091,195 A | 2/1992 | Havens | 426/2 |
| 5,246,717 A | 9/1993 | Garwin | 426/2 |
| 5,336,672 A | 8/1994 | Southern, Jr. et al. | |
| 5,374,425 A | 12/1994 | Porter | 424/93.45 |
| 5,520,938 A | 5/1996 | Brunnquell | 426/106 |

FOREIGN PATENT DOCUMENTS

| | | |
|---|---|---|
| EP | 0157619 | 10/1985 |
| GB | 2271497 | 4/1994 |
| JP | 0115159 | 7/1982 |
| JP | 2171147 | 7/1990 |

OTHER PUBLICATIONS

Cheng, C.Y. and M. Hsu, 1997. "Effect of Dietary Chromium on Egg Yolk Cholesterol Level", AAAP Presentation May 1997, Taiwan.

Curtis, P.A., F.A. Gardner and D.B. Mellor, 1986. "A Comparison of Selected Quality and Compositional Characteristics of Brown and White Shell Eggs, III. Composition and nutritional characteristics", *Poultry Science* 65:501–507 (Mar. 1986).

McNaughton, J.L. 1978. "Effect of Dietary Fiber on Egg Yolk, Liver, and Plasma Cholesterol Concentrations of the Laying Hen", *Journal of Nutrition* 108:1842–1848.

Jaroni, D.; S.E. Scheideler and C.L. Wyatt, 1996. "The Effect of Dietary Wheat Midds and Enzyme Supplementation on Late Egg Production Efficiency, Egg Yields and Composition", *Poultry Science* 75:15 (abstract).

Haddadin, M.S.Y., S.M. Abdulrahim, E.A.R. Hashlamoun, and R.K. Robinson, 1996, "The Effect of *Lactobacillus acidophilus* on the Production and Chemical Composition of Hen's Eggs", *Poultry Science* 75:491–494.

Mohan, B., R. Kadirvel, M. Bhaskaran and A. Natarajan, 1995. "Effect of Probiotic Supplementation on Serum/Yolk Cholesterol and on Egg Shell Thickness in Layers", *British Poultry Science* 36:799–803.

Pesti, G., et al. "Studies on the Effect of Feeding Cupric Sulfate Pentahydrate to Laying Hens on Egg Cholesterol Content", *Poultry Science*, 77:1540–1545 (1998).

Advertisement literature for Bio–Chrome (Alltech, Inc.), Aug. 1996.

Jin, L.Z. et al., "Probiotics in poultry: modes of action", *World's Poultry Science Journal*, 53:351–368 (Dec. 1997).

Stadelman, W.J. and Pratt, D.E., "Factors influencing composition of the hen's egg", *World's Poultry Science Journal*, 45: 247–266 (Nov. 1989).

Miles, R.D., "Designer Eggs: Altering Mother Nature's Most Perfect Food", *Proceedings of Alltech's Fourteenth Annual Symposium*, 423–435, Nottingham University Press.

*Primary Examiner*—Anthony Weier
(74) *Attorney, Agent, or Firm*—Drinker Biddle & Reath LLP

(57) ABSTRACT

A feed for producing reduced-cholesterol brown eggs from brown-egg-laying fowl is provided. The feed contains organic chromium, bacterial culture for improving digestion, at least one enzyme for improving digestion, and at least about 2 wt. % fiber.

14 Claims, 2 Drawing Sheets

US 6,805,886 B2

FEED COMPOSITION FOR EGG-LAYING FOWL

RELATED APPLICATION

This application is a divisional of U.S. patent application Ser. No. 09/535,125, now U.S. Pat. No. 6,436,451, filed Mar. 24, 2000 which claims benefit of the filing date of U.S. provisional patent application Ser. No. 60/126,352, filed Mar. 26, 1999. The entire disclosures of the aforesaid applications are incorporated herein by reference.

FIELD OF THE INVENTION

The invention relates generally to a feed for egg-laying fowl, and particularly to a feed that enables reduced cholesterol eggs to be produced.

BACKGROUND OF THE INVENTION

People are mindful of their dietary cholesterol intake because elevated cholesterol levels have been linked to heart disease in humans. Since chicken eggs are a comparatively prominent source of cholesterol, eggs are resultingly avoided in diets. This is unfortunate since eggs are an excellent source of protein and other nutrients. There is also a growing trend to develop food products that are "cholesterol-free", or of "low cholesterol" or "reduced cholesterol". Because of the egg's prominence as a source of cholesterol, efforts have been undertaken to develop methods of producing or identifying eggs having lower naturally occurring levels of cholesterol.

To date, dietary chicken feeds have been developed on an experimental non-commercial basis with claims that lower cholesterol levels can be achieved in eggs laid by chickens so fed. The eggs produced from such feeds are exclusively white eggs, as distinguished from brown egg varieties.

Various feed supplements have been disclosed that significantly reduce cholesterol levels in white eggs. For example, Haddadin et al. disclose decreased levels in yolk cholesterol in eggs laid by Lohman white hens that were fed a diet supplemented with a strain of *Lactobacillus acidophilus*. U.S. Pat. No. 5,091,195 (Havens) discloses a feed for producing lower cholesterol eggs containing dehydrated cabbage. The dehydrated cabbage is treated so that hydroxylase enzyme naturally contained therein is not inactivated. McNaughton, *J. Nutrition* 108:1842–1848, 1978, discloses reduced yolk cholesterol levels in eggs produced from white Leghorn laying hens fed a high-fiber diet (dietary fiber levels as high as 8.79%).

SUMMARY OF THE INVENTION

A feed is provided for producing reduced-cholesterol brown eggs from brown-egg-laying fowl. The feed comprises organic chromium, bacterial culture for improving the digestion of the fowl, at least one enzyme for improving the digestion of the fowl, and at least about 2 wt. % fiber, preferably at least 3 wt. % fiber.

The bacterial culture is preferably a probiotic culture of a species selected from the group consisting of *Lactobacillus acidophilus, Lactobacillus casei, Streptococcus faecium, Bifidobacterium bifidum, Aspergillus oryzae* and mixtures thereof. The enzyme is preferably selected from the group consisting of xylanase, α-amylase, β-glucanase, pectinase, protease, phytase, pentosanase, and combinations thereof. The feed preferably contains organic chromium supplied by chromium-containing yeast in the feed.

Organic chromium is present in the feed in the preferred range of from about 600 ppb to about 800 ppb. The bacterial culture and enzyme are present in an amount effective to improve the digestion of the fowl. Accordingly, the bacterial culture is present in the feed in the preferred range of from about 1 lb. to about 4 lbs. per ton of feed. The enzyme is present in the feed in the preferred range of from about 1.5 lbs. to about 2.0 lbs. per ton of feed. The preferred amount of fiber is from about 2 wt. % to about 6 wt. %, based upon the total feed weight.

A method for providing brown eggs having reduced cholesterol content is provided. The method comprises feeding to brown-egg-laying fowl a composition comprising organic chromium, bacterial culture for improving digestion of the fowl, at least one enzyme for improving digestion of the fowl, and at least about 2 wt. % fiber; and collecting the brown eggs produced by the fowl so fed. Brown eggs so produced contain less that about 170, more preferably less than 165, most preferably less than 160, mg cholesterol per 50 mg liquid egg.

DETAILED DESCRIPTION OF THE INVENTION

Figure 1:
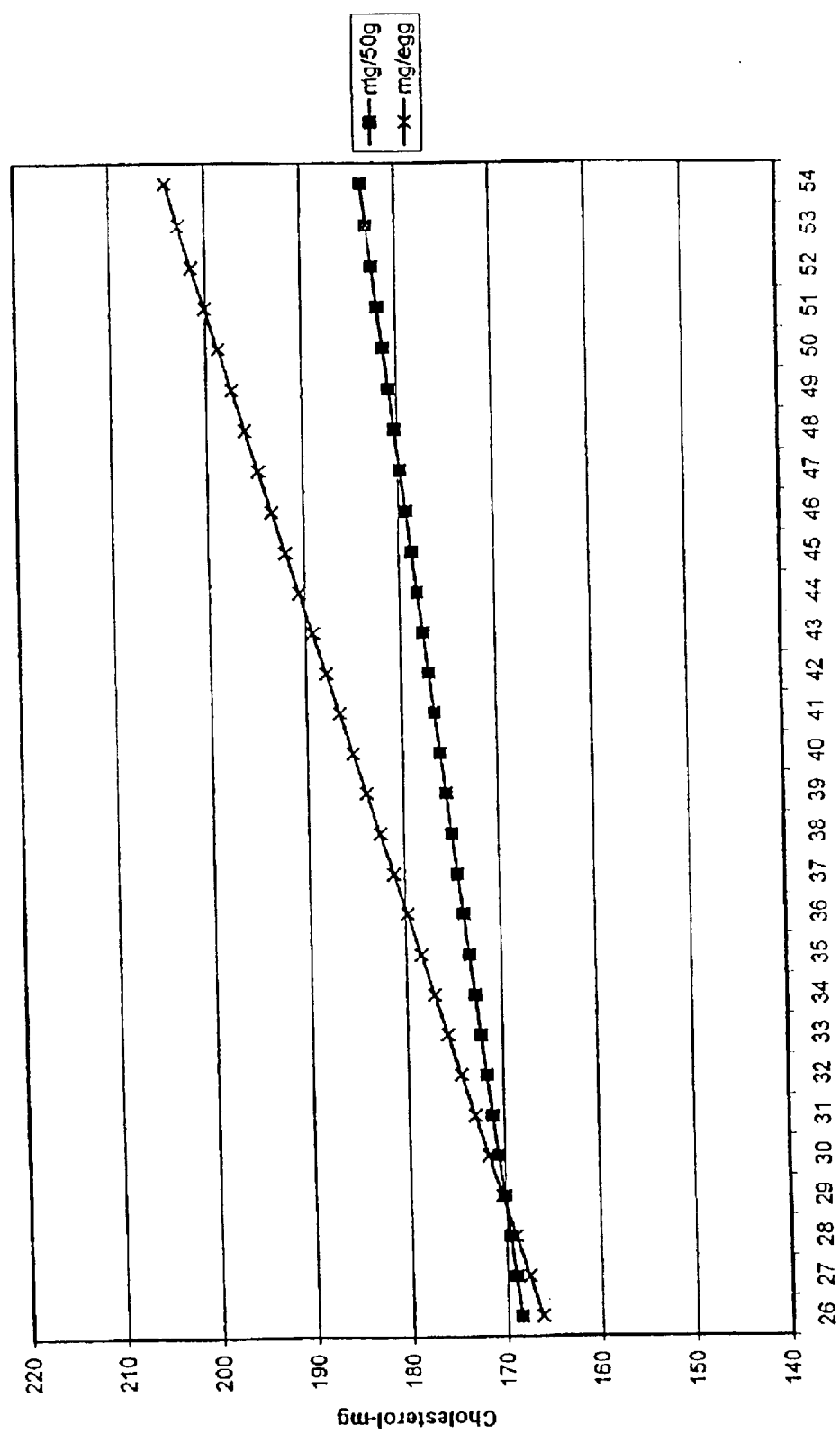
FIG. 1 is a graph of white egg cholesterol levels, as a function of flock age, resulting from white egg layers receiving a feed of the invention.

A dietary feed for egg-laying fowl is provided. A diet comprising this feed enables the production of reduced cholesterol brown eggs.

The organic chromium content of the feed of the invention is preferably provided by chromium-containing yeast. "Chromium-containing yeast" is defined herein to mean yeast that is supplemented with organic chromium or an organic chromium-containing compound. "Chromium-containing yeast" is generally prepared by culturing the yeast organism in organic chromium-rich solution, usually containing chromium nicotinate; yeast organisms are natural sources of chromium but chromium-containing yeast are cultured to have elevated levels of organic chromium. "Organic chromium" is chromium associated with organic compounds, as opposed to elemental chromium or free chromium ions in solution.

The feed of the invention preferably contains from about 600 ppb to about 800 ppb organic chromium, and most preferably from about 650 ppb to about 750 ppb organic chromium. Chromium-containing yeast preferably contains organic chromium in the range of from about 650 ppm to about 1000 ppm. The preferred amount of organic chromium can be delivered to the feed of the invention by utilizing from about 500 g to about 700 g of 1000 ppm chromium-containing yeast in the feed. Chromium-containing yeast may be obtained commercially. A preferred source is Bio-Chrome™ (Co-Factor III) from Alltech, Inc. (Nicholasville, Ky.).

The feed of the invention contains bacterial culture for the purpose of maintaining the hen's intestinal microflora, promoting the hen's digestive enzyme activity, improving the hen's feed intake, and stimulating the hen's immune system to improve resistance to pathogenic bacteria. The bacterial culture is preferably a probiotic culture. A probiotic culture, or "direct-fed microbial" is a live microbial feed supplement which beneficially affects the host animal by improving microbial balance. The probiotic culture contains a bacterial culture of species selected from the group consisting of *Lactobacillus acidophilus, Lactobacillus casei, Streptococcus faecium, Bifidobacterium bifidum, Aspergillus oryzae* and mixtures thereof. "Species" is understood to include "sub-species". The probiotic cultures employed in the feed of the invention are most preferably viable primary cultures or fermentation products.

Depending upon the age of the flock being fed, one ton of feed contains from about 1 lb. to about 4 lbs. of the bacterial culture, most preferably from about 1.5 lbs. to about 2 lbs.

The feed of the invention contains at least one enzyme for improving the digestion of the fowl. Enzymes serve to additionally aid the hen's digestion of the feed, reduce the passage of fibrous material, improve the hen's weight gain, and reduce digesta viscosity. Enzymes also reduce the negative effects of anti-nutritional substances in the feed.

The digestion-improving enzymes employed in the feed of the invention are generally carbohydrases, proteinases, and lipases. Preferably, the enzymes are selected from the group consisting of xylanase, α-amylase, β-glucanase, pectinase, protease, phytase, pentosanase, and combinations thereof. The choice of enzyme may be dependent upon the predominant grain in the feed. For example, pentosanase is preferred for wheat-based diets.

The enzymes are preferably present in the feed of the invention in a concentration of from about 1.5 lbs. to about 2.0 lbs., per enzyme, per ton of feed. The enzymes may be commercially obtained. Preferred commercial enzymes sources include Avizyme™ (Finnfeeds International; Fenton, Mo.) and Allzyme™ (Alltech, Inc.; Nicholasville, Ky.).

Alternative sources for enzymes include vegetable matter. For example, dehydrated cabbage contains aromatic hydrocarbon hydroxylase.

The feed of the invention also contains crude fiber. Crude fiber, also known as non-starch polysaccharides, is the fibrous carbohydrate portion of feed that is usually indigestible to the animal due to the lack of appropriate enzymes in the animal's metabolism. A high-fiber diet is understood herein to constitute at least about 2 wt. % total crude fiber, more preferably at least 3 wt. % crude fiber. Preferably, the fiber content of the feed ranges from about 2 to about 6 wt. %, most preferably from about 3 to about 4 wt. %. Oats and barley are common sources of fiber. The fiber by-product remaining in residual meals after production of various oils, e.g., canola oil, sunflower oil, safflower oil, and the like may also be used as a source of fiber for the feed.

The feed of the invention optionally contains copper as a supplement. Copper is preferably present in the feed at a concentration of from about 100 to about 200 ppm. While copper in excess of 200 ppm may be added to the feed, there appears to be no benefit in doing so.

Sources of dietary copper may be obtained commercially. A preferred source is Bioplex Copper™ from Alltech, Inc. (containing 10% copper as copper proteinate). Thus, one ton of the feed of the invention most preferably contains about 2 lbs. Bioplex Copper™. Another source of dietary copper is copper sulfate (commercially available from Prince Agri Products, Inc.; Quincy, Ill.).

The feed of the invention may optionally contain one or more vegetable oils such as, for example, corn oil; canola oil, soybean oil, safflower oil and sunflower oil. A mixture of vegetable oils may be utilized. Corn oil and combinations including corn oil are preferred. When present, the vegetable oil concentration in the feed is from about 1 to about 6 wt. %, preferably from about 2 to about 4 wt. %, based on the total feed.

In addition to the supplements noted above, the feed of the invention comprises conventional ration containing conventional ingredients in conventional concentrations as understood by one of ordinary skill in the art. The bulk of the ration comprises feedstuffs appropriate for fowl, that is, primarily vegetable matter, such as, for example, corn, soybean, oats, barley, and the like, along with common nutritive supplements such as calcium.

The feed of the invention may be prepared by mixing the constituents in any conventional fashion for preparing chicken feeds. The preferred feed of the invention has been prepared by a commercial mill following a prescribed formulation.

The feed of the invention has been shown to lower the cholesterol in brown eggs. "Brown eggs" are understood herein to refer to egg shells having a definite shade of brown color, which may vary from light brown to dark brown. Brown eggs are distinguished from white eggs or cream-colored eggs. See United States Department of Agriculture, *Shell Egg Graders Handbook*, AMS PY Instruction No. 910 (March 1992), which is incorporated herein by reference. The brown-egg-laying chickens utilized in producing the brown eggs of the invention (and in Example 1 below) were Hy-Line Browns (Hy-Line International, 2929 Westown Parkway, P.O. Box 65190, West Des Moines, Iowa 50265), a derivation of a Rhode Island Red variety. Another preferred brown-egg-laying variety is Bovan Brown, available from Centurion Parkway, Bogart, Ga.).

The diet incorporating the feed of the invention is preferably began prior to the $30^{th}$ week of the hen's life, and most preferably prior to the $25^{th}$ week. The chickens (hens) may be fed the feed of the invention in a "free choice" manner, wherein feed is available at all times to the fowl. Brown hens consume, on average, about 0.25 lbs. feed/day/hen; white egg-laying hens consume about 0.22 lbs./day/hen, on average. Alternatively, commercial feed systems which can be generally controlled by a clock, may be used to permit feeding frequency to be manipulated.

The feed of the invention is used to produce eggs having reduced cholesterol levels. "Cholesterol levels" are those levels of cholesterol found in the liquid part of the egg; that is, the interior contents of a whole egg. The standard cholesterol level for an egg is understood to be 213 mg per 50 g liquid egg (American Egg Board, *Eggcyclopedia*, $3^{rd}$ Ed. (1981), pp. 7,36.). This is a reference point for comparing cholesterol reduction. "Reduced cholesterol" means an amount less that the standard amount.

Brown eggs produced from brown-egg-laying hens fed the feed of the invention contain less than about 170 mg, more preferably less than about 165 mg, most preferably less than 160 mg, cholesterol per 50 g liquid egg. Additionally, such brown eggs have been observed to contain about 5–10% higher moisture levels than conventional brown eggs. Brown eggs of the invention contain yolk and albumen percentages approximately equivalent to conventional brown eggs.

Cholesterol levels are often reported in units of "mg/50 g". These units refer to the common practice of determining cholesterol levels in particular batches of eggs (at least as conducted by the United States Food and Drug Administration) by blending the liquid contents of one dozen eggs and analyzing a 50 g sub-sample therefrom for cholesterol. In the example below, measured cholesterol values for a blend of 4–6 eggs are extrapolated to units of mg cholesterol/50 g liquid egg.

The practice of the invention is illustrated by the following non-limiting examples.

EXAMPLE 1

The cholesterol level in white and brown eggs was evaluated over a 28-week period as follows.

White-egg-laying hens (White Leghorn Hy-Line W-36 strain; "white layers") and brown-egg-laying hens ("brown layers") were both fed a dietary feed of the invention. The formulation for one ton of the dietary feed was as follows:

| | |
|---|---|
| Corn | 838.8 (lbs.) |
| Soybean meal | 404.0 |
| Flax | 280.0 |
| Oats | 100.0 |
| Barley | 100.0 |
| Limestone | 150.0 |
| Oyster Shell | 40.0 |
| Dicalcium Phosphate | 25.2 |
| Salt | 6.0 |
| DL-Methionine | 4.0 |
| Vegetable Oil | 24.0 |
| Biotene | 20.0 |
| Marigold | 2.0 |
| Probiotic | 1.5 |
| Enzymes (β-glucanase; xylanase; α-amylase) | 3.0 |
| Chromium-containing Yeast (680 g of 1000 ppm Chromium) | 1.5 |

When the flock age was about 26 weeks old, cholesterol levels were thereafter measured during the egg production cycle in egg samples constituting 4–6 blended eggs.

Determination of cholesterol levels from sample eggs followed the procedure outlined herein. Four whole eggs were pooled and blended for 30 seconds. Samples of 5 ml from each experimental group of four blended eggs were placed into separate vials and lyophilized for 48 hours. Samples were prepared and analyzed pursuant to a method disclosed in Abdollahi, et al. "A micro-extraction method for tocopherols and the application to a quantitative analysis of lipophilic nutrients in foods", *J. Food Science* 58(3):663–666 (1993). A 0.1 g sample of the freeze-dried powder (lyophilized eggs) was weighed out and placed into a test tube. To this, 1 mL of water was added followed by 3 mL of a 3:1 hexane: isopropanol mixture. The sample was then aggressively mixed for 20 minutes by vortexing and sonication, then centrifuged for 5 minutes at 2000 rpm. The upper organic solvent layer was transferred to another test tube and the aqueous layer was extracted with an additional 3 mL of the 3:1 hexane:isopropanol mixture. After vortexing, sonication, and centrifugation as before, the upper layer was removed and pooled with the first. A 600 uL aliquot of the sample was placed into vials for HPLC (High Performance Liquid Chromatography) analysis.

Perkin Elmer HPLC equipment was used for quantitative analysis, consisting of a Binary Pump, Autosampler, a Solvent Manifold System, and a Single Channel Interface to Omega-2-software. Cholesterol was detected using a UV detector (Hitachi) set at 205 nm. Prior to each run, helium was used to degas the solvents (hexane and isopropanol). The pump was then purged and the column was washed with a 50:50 hexane:isopropanol mixture. A mobile phase consisting of hexane and isopropanol (95:5) with a flow rate of 1.5 ml/min was used to separate cholesterol. Peak areas were used to calculate cholesterol values. The determined retention time of cholesterol based upon the injection of a standard was 5.9 minutes. Approximate running time of one sample was 9 minutes.

Figure 2:
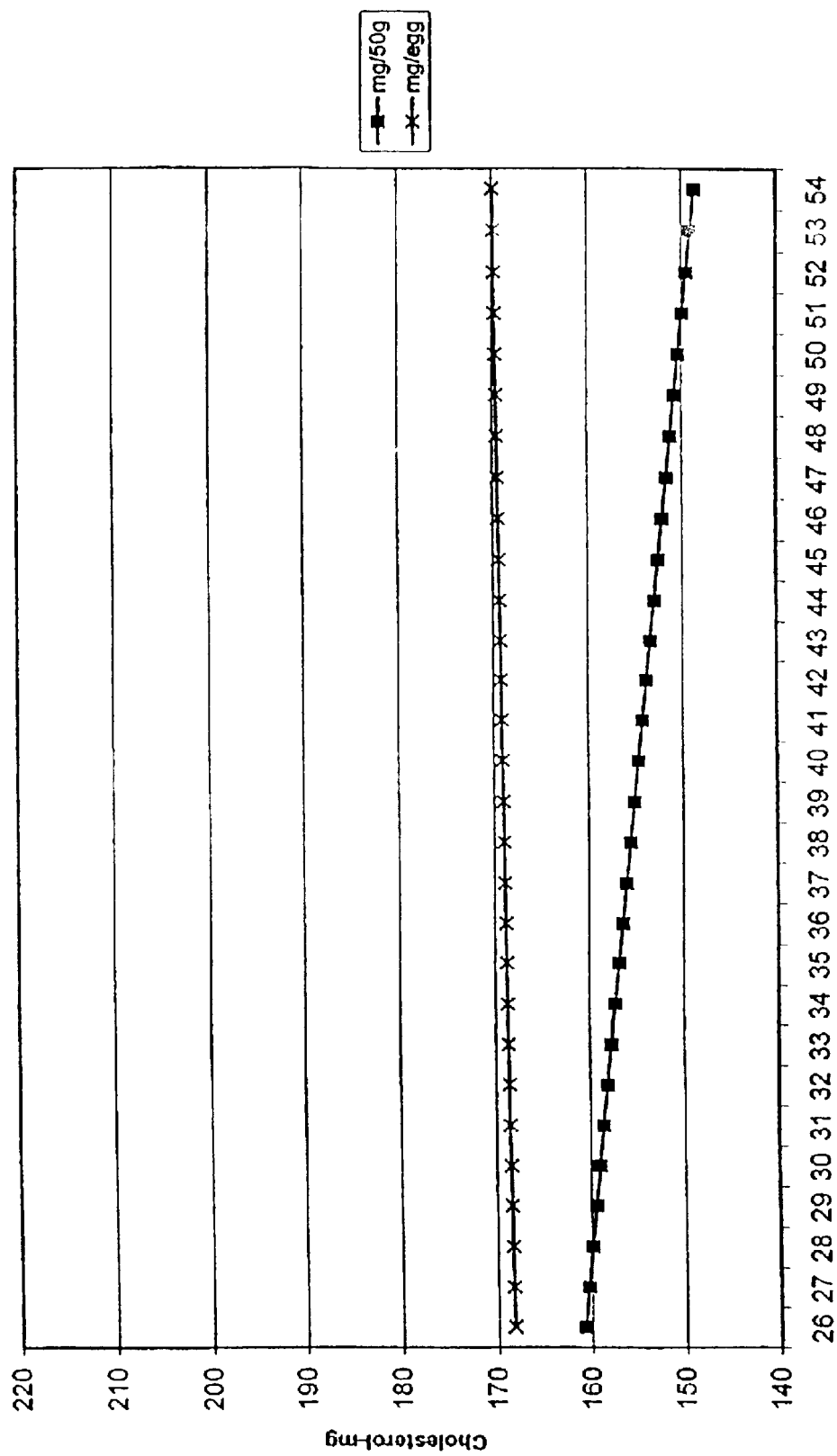
FIG. 2 is a graph of brown egg cholesterol levels, as a function of flock age, resulting from brown egg layers receiving a feed of the invention.

FIG. 1 sets forth the cholesterol levels measured in white eggs. The results of brown egg cholesterol levels are shown in FIG. 2. The results indicate that the dietary feed exerted little influence on the cholesterol content of white eggs, as evidenced by the steady increase in cholesterol as the egg production cycle progressed. In contrast, the cholesterol level per brown egg remained relatively constant over the same time period. Cholesterol concentration (mg cholesterol/50 g portion) decreased during the cycle as flock age and brown egg size increased.

The results (FIG. 1) show that cholesterol levels in white eggs (mg cholesterol/egg) steadily increased as egg size (related to flock age) increased, and that concomitantly, cholesterol level per 50 g liquid egg sample increased, though at a slower rate. Brown egg data (FIG. 2) illustrate, surprisingly, a different trend: as egg size increased, the total amount of cholesterol remained relatively constant, thus the level of cholesterol per 50 g liquid egg sample steadily decreased. The results in FIG. 2 show that cholesterol levels for brown eggs were driven below 160 mg/50 g, meeting the criteria for "reduced cholesterol" levels.

As a control, brown egg layers were fed a conventional commercial diet (Purina Layena) instead of the dietary feed of the invention. Cholesterol levels in the eggs of the control hens (data not shown) maintained cholesterol levels similar to that of the white layers receiving the feed of the invention.

EXAMPLE 2

The following is an alternative feed according to the invention.

| | |
|---|---|
| Corn | 956.8 (lbs.) |
| Soybean meal | 530.0 |
| Oats | 100.0 |
| Barley | 100.0 |
| Limestone | 80.0 |
| Oyster Shell | 110.0 |
| Dicalcium Phosphate | 25.2 |
| Salt | 6.0 |
| DL-Methionine | 4.0 |
| Corn Oil | 60.0 |
| Biotene | 20.0 |
| Marigold | 2.0 |
| Probiotic | 1.5 |
| Enzymes (β-glucanase; xylanase; α-amylase) | 3.0 |
| Chromium-containing Yeast (680 g of 1000 ppm Chromium) | 1.5 |

All references cited with respect to synthetic, preparative, analytical or other procedures, or sources of materials or components, are incorporated herein by reference.

The present invention may be embodied in other specific forms without departing from the spirit or essential attributes thereof and, accordingly, reference should be made to the appended claims, rather than to the foregoing specification, as indicating the scope of the invention.

What is claimed is:

1. A feed for egg-laying fowl, the feed comprising:
   a. organic chromium;
   b. bacterial culture for improving the digestion of the fowl;
   c. at least one enzyme for improving the digestion of the fowl; and
   d. at least about 2 wt. % fiber.

2. A feed as in claim 1 comprising at least 3 wt. % fiber.

3. A feed as in claim 1, wherein the bacterial culture is a probiotic culture of a species selected from the group consisting of *Lactobacillus acidophilus, Lactobacillus casei,*

*Streptococcus faecium, Bifidobacterium bifidum, Aspergillus oryzae* and mixtures thereof.

4. A feed as in claim 1, wherein the enzyme is selected from the group consisting of xylanase, α-amylase, β-glucanase, pectinase, protease, phytase, pentosanase, and combinations thereof.

5. A feed as in claim 1, wherein the organic chromium is supplied by chromium-containing yeast in the feed.

6. A feed as in claim 1, wherein the organic chromium is present in the feed in the range of from about 600 ppb to about 800 ppb.

7. A feed as in claim 6, wherein the organic chromium is present in the feed in the range of from about 650 ppb to about 750 ppb.

8. A feed as in claim 1, wherein the bacterial culture is present in the feed in the range of from about 1 lb. to about 4 lbs. per ton of feed.

9. A feed as in claim 8, wherein the bacterial culture is present in the feed in the range of from about 1.5 lbs. to about 2.5 lbs. per ton of feed.

10. A feed as in claim 1, wherein the enzyme is present in the feed in the range from about 1.5 lbs. to about 2.0 lbs. per ton of feed.

11. A feed as in claim 1, wherein the fiber content is from 3% to about 6% by weight of the feed.

12. A feed as in claim 1, further comprising at least about 100 ppm copper.

13. A feed as in claim 1, wherein the organic chromium is present in the feed in the range from about 600 ppb to about 800 ppb, the bacterial culture is present in the feed in the range from about 1 lb. to about 4 lbs. per ton of feed, and the enzyme is present in the feed in the range from about 1.5 lbs. to about 2.0 lbs. per ton of feed.

14. A feed as in claim 13, wherein the organic chromium is present in the feed in the range from about 650 ppb to about 750, the bacterial culture is present in the feed in the range from about 1.5 lbs. to about 2.5 lbs. per ton of feed, the enzyme is present in the feed from about 1.5 lbs. to about 2 lbs. per ton of feed and fiber is present in an amount of from 3 to 6% by weight of the feed.

* * * * *